United States Patent [19]

Asayama et al.

[11] Patent Number: 5,038,286

[45] Date of Patent: Aug. 6, 1991

[54] METHOD FOR CONTROLLING TRANSMISSION SYSTEM

[75] Inventors: Yoshio Asayama, Chigasaki; Makio Tsubota, Hiratsuka; Yasunori Okura, Hiratsuka; Takayuki Sato, Hiratsuka, all of Japan

[73] Assignee: Kabushiki Kaisha Komatsu Seisakusho, Japan

[21] Appl. No.: 534,737

[22] Filed: Jun. 7, 1990

[51] Int. Cl.⁵ ............................................. B60K 41/02
[52] U.S. Cl. .................................. 364/424.1; 74/866
[58] Field of Search ................ 364/424.1; 74/866–869

[56] References Cited

U.S. PATENT DOCUMENTS 4,836,057 6/1989 Asayama et al. ...................... 74/867
4,951,200 8/1990 Leising et al. .................... 364/424.1
4,993,285 2/1991 Asayama et al. ...................... 74/869

Primary Examiner—Salvatore Cangialosi
Attorney, Agent, or Firm—Welsh & Katz, Ltd.

[57] ABSTRACT

A method for controlling a transmission system mounted on such as a traveling machine or a construction machine, the transmission system having a two-stage clutch configuration in which a speed is selected through a combination of a plurality of sub transmission clutches and a plurality of main transmission clutches. At the time of speed change, engagement is started beginning with the main transmission clutch side, and the engagement of the sub transmission clutch is commenced upon completion of the filling of the oil in the main transmission clutch, thereby reducing the two speed-change shocks, including a reverse shock, which are conventionally experienced.

4 Claims, 9 Drawing Sheets

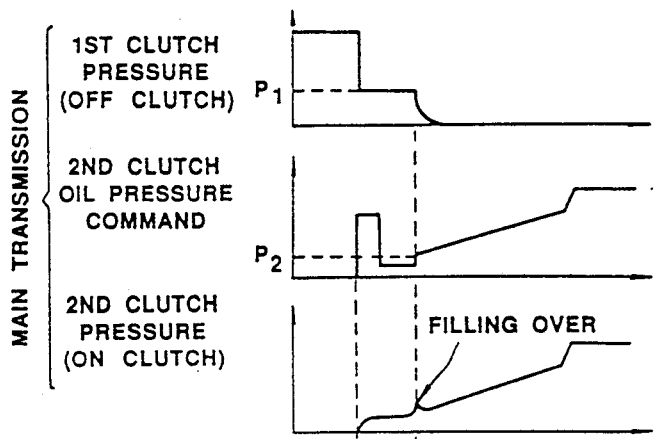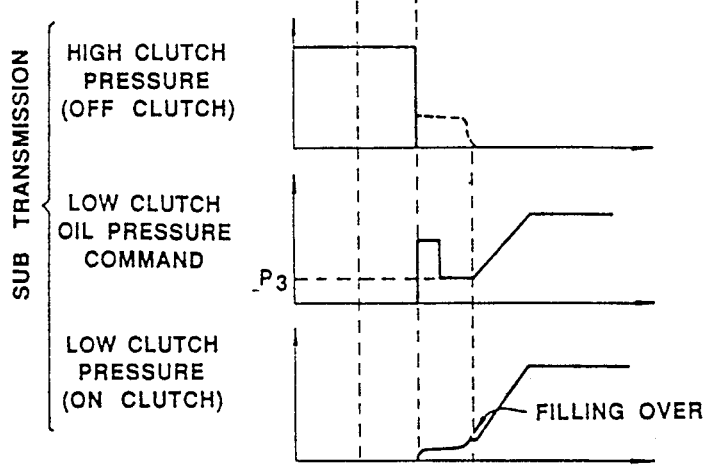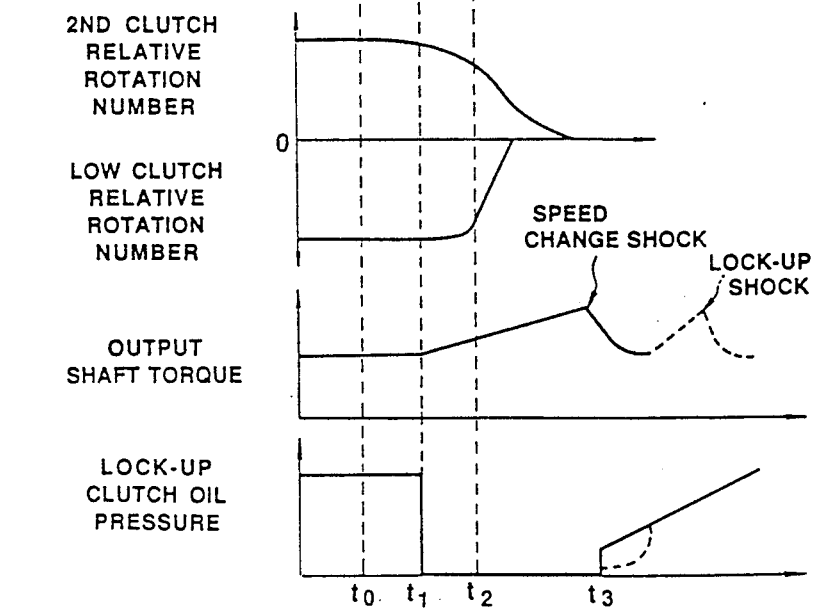

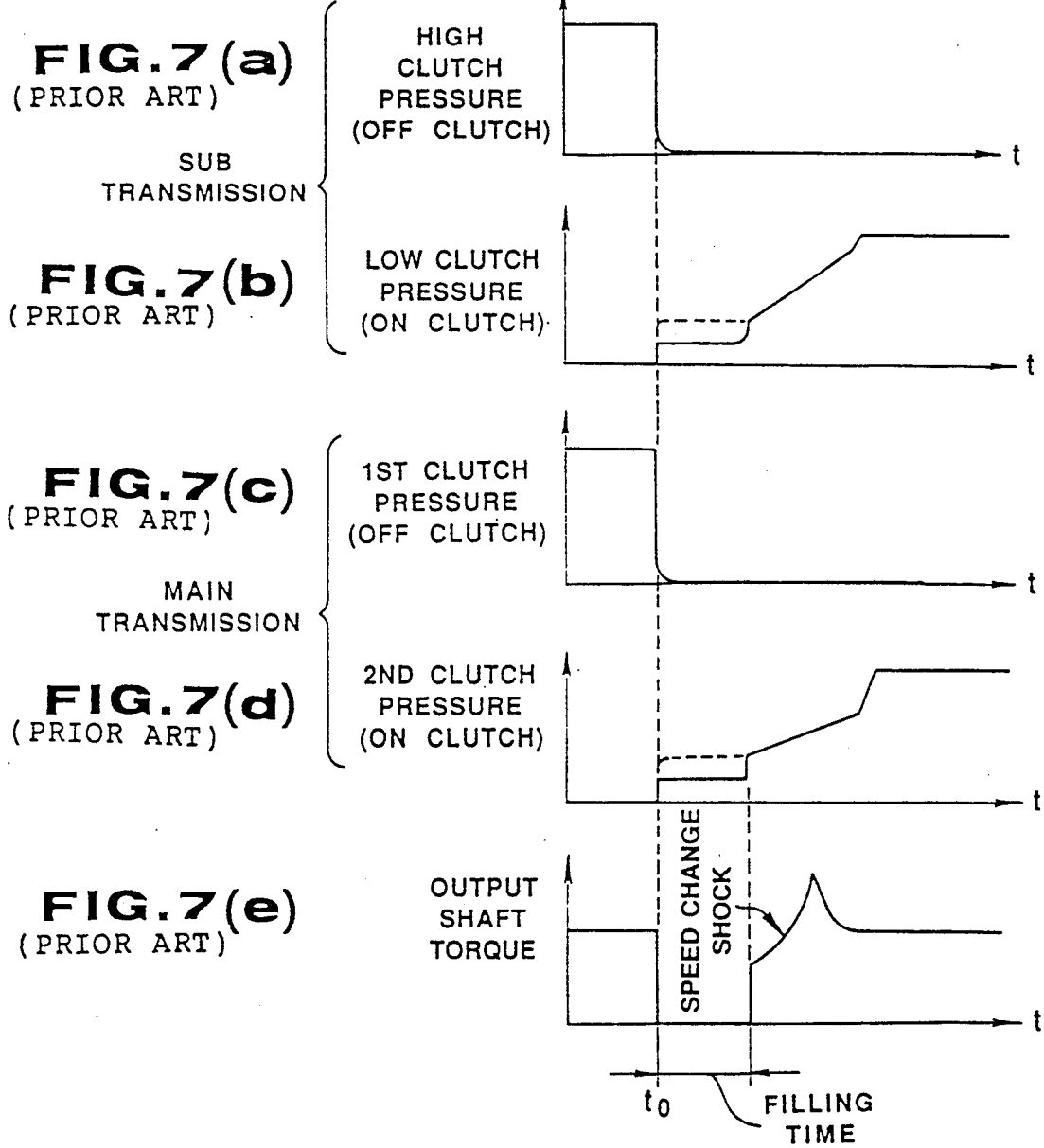

SUB TRANSMISSION — HIGH CLUTCH PRESSURE (OFF CLUTCH)

LOW CLUTCH PRESSURE (ON CLUTCH)

MAIN TRANSMISSION — 1ST CLUTCH PRESSURE (OFF CLUTCH)

2ND CLUTCH PRESSURE (ON CLUTCH)

OUTPUT SHAFT TORQUE

FIG. 9(a) (PRIOR ART) SUB TRANSMISSION
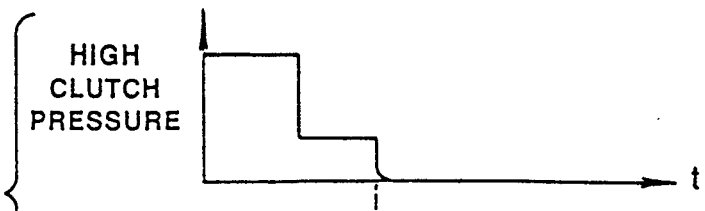
HIGH CLUTCH PRESSURE
FIG. 9(b) (PRIOR ART)
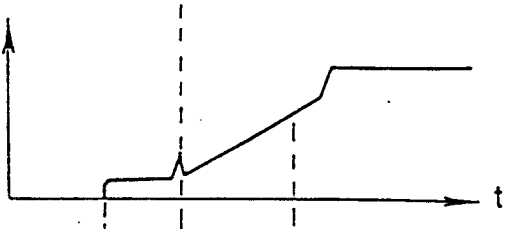
LOW CLUTCH PRESSURE
FIG. 9(c) (PRIOR ART) MAIN TRANSMISSION
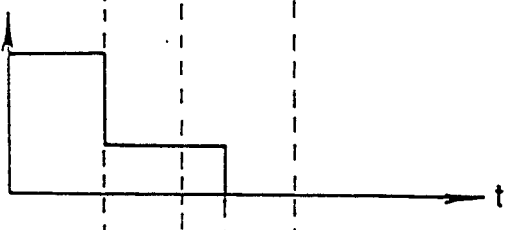
1ST CLUTCH PRESSURE
FIG. 9(d) (PRIOR ART)
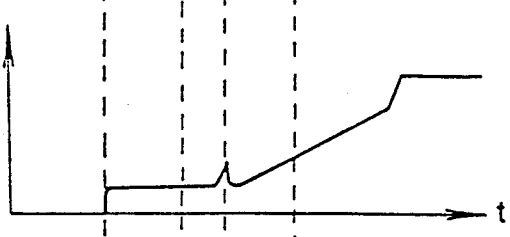
2ND CLUTCH PRESSURE
FIG. 9(e) (PRIOR ART)
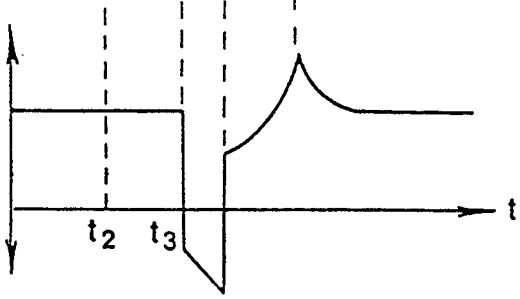
OUTPUT SHAFT TORQUE
$t_2$ $t_3$
H1 (2ND SPEED) | L1 (1ST SPEED) | L2 (3RD SPEED)

METHOD FOR CONTROLLING TRANSMISSION SYSTEM

BACKGROUND OF THE INVENTION

1. Field of the Invention

The present invention relates to a method for controlling a transmission system of such as a traveling machine, a construction machine, or the like, and more particularly to a method for reducing a shock occuring at the time of a speed change in a transmission system having clutches of a two-stage configuration composed of a main transmission and a sub transmission.

2. Description of the Related Art

In a transmission system having clutches in a first stage (sub transmission) on the input shaft side of a transmission and clutches in a second stage (main transmission) on the output shaft side thereof, a speed is selected through a combination of the sub transmission-side clutches and main transmission-side clutches.

Conventionally, a typical method of effecting a speed change in this type of transmission system is shown in FIG. 7. Specifically, at the time of a speed change, pressure oil is supplied simultaneously (at a timing $t_0$) to clutches (Low, 2nd) to be set to on among the clutches (High, Low) on the sub transmission side and the clutches (1st, 2nd) on the main transmission side, and the engagement of these on clutches is effected substantially simultaneously (in which case, since the sub transmission-side clutch has a smaller capacity, the sub transmission is normally engaged earlier). That is, in this conventional method, the supply of oil to the two clutches is commenced simultaneously during the speed change.

However, with this conventional method, no problem is presented when the pump discharge is sufficient, but in cases where the pump discharge is smaller than the capacity of the two clutches, the filling time, i.e., the period of torque off is generally prolonged. At the same time, a problem is encountered in that a large speed-change shock occurs due to this torque off and the like, as shown in the part (e) of FIG. 7.

In addition, as another conventional method, one shown in FIG. 8 is known in which the shift on the sub transmission side (High→Low) is effected earlier than the shift on the main transmission side (1st 2nd). With this conventional method, since the pressure of the 1st clutch, i.e., the main transmission-side off clutch, is built at the timing $t_1$ when the filling of the Low clutch is completed, a speed change from the 2nd speed (H1) 1st speed (L1)→3rd speed (L2) is carried out although a speed increase from 2nd speed (H143 3rd speed (L2) should be carried out. Hence, positive and negative speed-change shocks are produced, as shown in the part (e) of the drawing. In this transmission, if the Low clutch, the High clutch, the 1st clutch, and the 2nd clutch are respectively abbreviated as L, H, 1, and 2, then L1, H1, L2, and H2 respectively correspond to the 1st speed, 2nd speed, 3rd speed, and 4th speed.

Furthermore, FIG. 9 shows a case where, in an arrangement in which electronically operated pressure control valves are provided separately for all the clutches H, L, 1, and 2, pressure oil is supplied simultaneously (at a timing $t_2$) to the main and sub clutches (L, 2) to be set to on, and the sub transmission-side L clutch has completed the filling earlier (at a timing $t_3$). In this case as well, the same phenomenon as the case shown in FIG. 8 occurs due to a time difference in the completion of filling of the main and sub transmissions.

SUMMARY OF THE INVENTION

Accordingly, an object of the present invention is to provide a method for controlling a transmission which makes it possible to reduce shock at the time of speed change and improve acceleration performance by eliminating the torque off time, thereby overcoming the above.described drawbacks of the conventional art.

To this end, in accordance with the present invention, there is provided a method for controlling a transmission system wherein pressure control valves connected to sub transmission clutches and main transmission clutches are controlled at the time of speed change when clutches to be engaged are both sub transmission clutches and main transmission clutches, the method comprising the sequential steps of:

actuating the pressure control valve corresponding to the main transmission clutch to be engaged, thereby supplying pressure oil to the main transmission clutch;

confirming the completion of a filling time of the main transmission clutch;

upon confirming the completion of the filling time, turning off the pressure control valve corresponding to the main transmission clutch being presently engaged, actuating the pressure control valve corresponding to the sub transmission clutch to be engaged so as to supply the pressure oil to the sub transmission clutch, and controlling the pressure control valve corresponding to the main transmission clutch in such a manner as to gradually increase the pressure of the main transmission clutch for which the completion of the filling time has been confirmed;

confirming the completion of the filling time with respect to the sub transmission clutch; and upon confirming the completion of the filling time of the sub transmission clutch, turning off the pressure control valve corresponding to the sub transmission clutch being presently engaged, and controlling the pressure of the sub transmission clutch for which the completion of the filling has been confirmed by gradually increasing the clutch pressure in such a manner that the sub transmission clutch is engaged earlier than the main transmission clutch.

The timing when the sub transmission clutch being presently engaged is set to.off may be set immediately after confirming the completion of filling of the main transmission clutch.

In other words, in accordance with the above-described controlling method, in order to optimally control a timing for shifting the main transmission and the sub transmission, a total clutch electronic modulation system is employed. In addition, engagement at the time of speed change is unfailingly commenced beginning with the main transmission-side clutch, and the supply of pressure oil to the sub transmission-side clutch is commenced upon completion of the filling on the main transmission side, thereby reducing the speed-change shock by reducing the two speed-change shocks, including a reverse shock, which is conventionally experienced to apparently one speed-change shock, and also eliminating the time when torque disappears during speed change. In consequence, "breathing" encountered at the time of speed change is prevented, and acceleration performance is improved.

In addition, the oil pressure buildup rate on the sub transmission side-clutch is set at a higher level than the main transmission side-clutch, and the engagement of the sub transmission side-clutch is completed midway in the engagement of the main transmission-side clutch, thereby reducing the speed-change shock and preventing the torque off.

Furthermore, in a transmission system having a lock-up clutch, the lock-up clutch is set to off upon confirmation of the completion of the filling time of the main transmission clutch, and the completion of the speed change is detected after the oil pressure of the sub transmission clutch is gradually increased. After this detection, the oil pressure of the lock-up clutch is increased gradually.

As the aforementioned method of detecting the completion of speed change, there are (I) a method based on the setting of time, (II) a method in which a timing when the relative number of revolutions of the clutch has become zero or a value close to zero is detected, and (III) a method in which a timing when a torque converter value e has exceeded a set value is detected.

The above and other objects, features and advantages of the present invention will become more apparent from the following detailed description of the invention when taken in conjunction with the accompanying drawings.

BRIEF DESCRIPTION OF THE DRAWINGS

FIG. 2 is a timing chart explaining an example of the specific operation of the embodiment;

FIGS. 7-9 are timing charts explaining the prior art.

DESCRIPTION OF THE PREFERRED EMBODIMENT

Referring now to the accompanying drawings, a detailed description will be given of an embodiment of the present invention.

Figure 3:
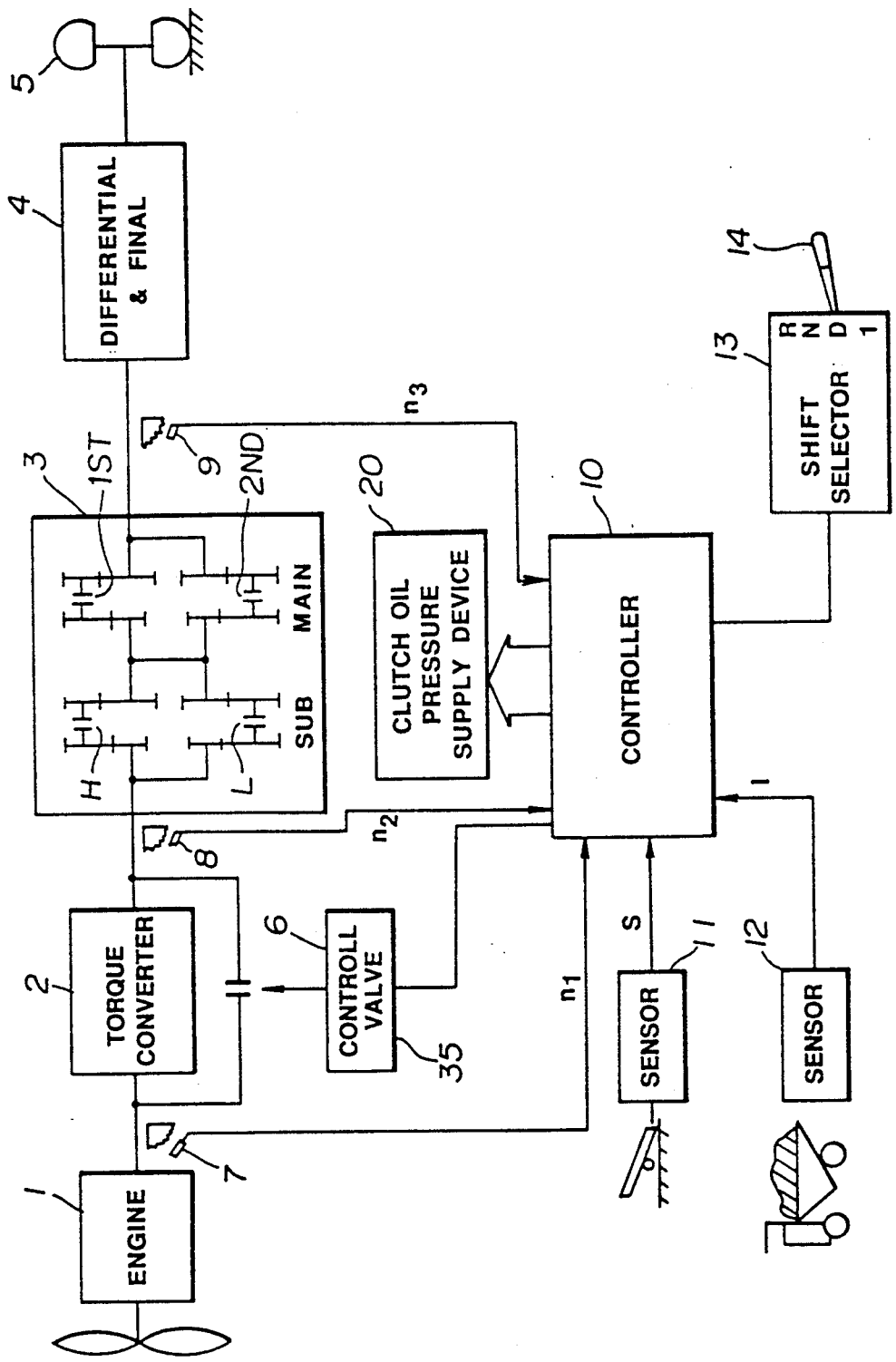
FIG. 3 is a block diagram illustrating an example of the overall configuration of a transmission system.

FIG. 3 illustrates a transmission system to which the present invention is applied.

In this drawing, an output of an engine 1 is transmitted to a transmission 3 via a torque converter 2, and an output of the transmission 3 is transmitted to drive wheels 5 via a differential gear/final reducing gear 4. Interposed between input and output shafts of the torque converter 2 is a lock-up clutch 6 for directly coupling them.

An engine revolution sensor 7 for outputting a signal representative of a value corresponding to an engine speed $n_1$ is provided for the engine 1, and revolution sensors 8 and 9 respectively outputting signals representative of values corresponding to the numbers of revolutions $n_2$, $n_3$ of input and output shafts of the transmission 3 are provided for the transmission 3. Outputs of these sensors are applied to a controller 10.

A throttle amount sensor 11 is adapted to detect an amount of a throttle pedal pressed and input a signal S representative of this amount of pressing to the controller 10. A vehicle weight sensor 12 detects a vehicle weight I (loadage) and inputs this detected value to the controller 10. A shift selector 13 inputs to the controller 10 a signal representative of a shift position (R, N, D, 1, ...) selected by a shift lever 14. It should be noted that an explanation of R is omitted for the convenience' sake.

The transmission 3 comprises sub transmission clutches H (High) and L (Low) in the first stage that are connected to the output shaft of the torque converter 2 as well as main transmission clutches 1st and 2nd in the second stage that are connected to the output shaft of the transmission 3. Thus the transmission 3 selects a speed (L1: 1st speed, H1: 2nd speed, L2: 3rd speed, and H2: 4th speed) through the sub transmission-side clutches H, L and the main transmission-side clutches 1st, 2nd.

Figure 4:
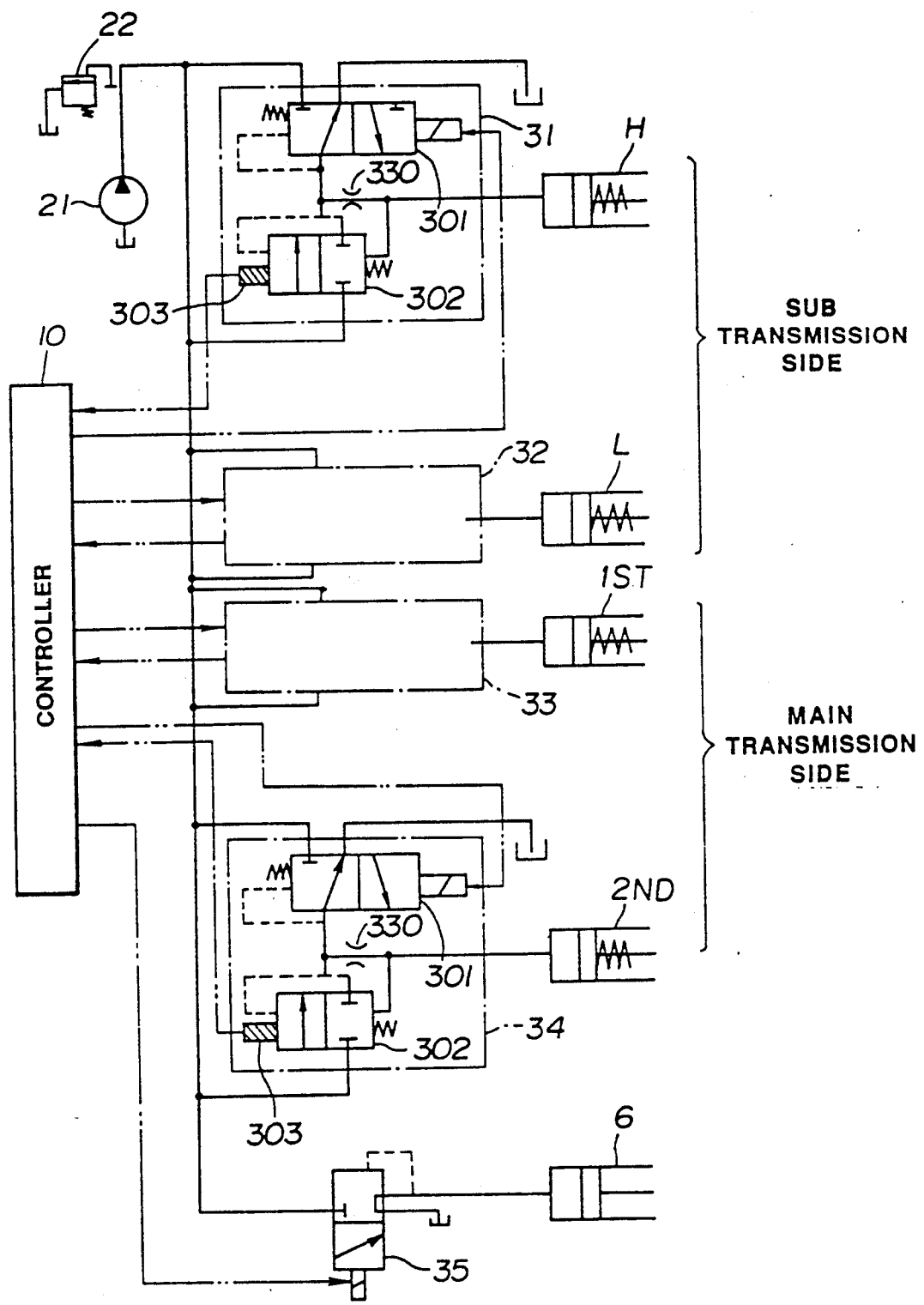
FIG. 4 is a hydraulic circuit diagram illustrating an internal configuration of a clutch oil pressure supplying device in the system shown in FIG. 3.

As shown in FIG. 4, a clutch pressure oil supplying device 20 for supplying the pressure oil to these clutches comprises a hydraulic pump 21 and a relief valve 22, as well as clutch oil pressure control valves 31, 32, 33, and 34 for applying oil pressure to the clutches H, L, 1st, and 2nd, respectively. In addition, the lock-up clutch 6 also has an electronically operated pressure-proportional control valve 35 for applying oil pressure to the clutch 6. These valves 31-35 are independently actuated by means of electric commands from the controller 10.

Figure 5:
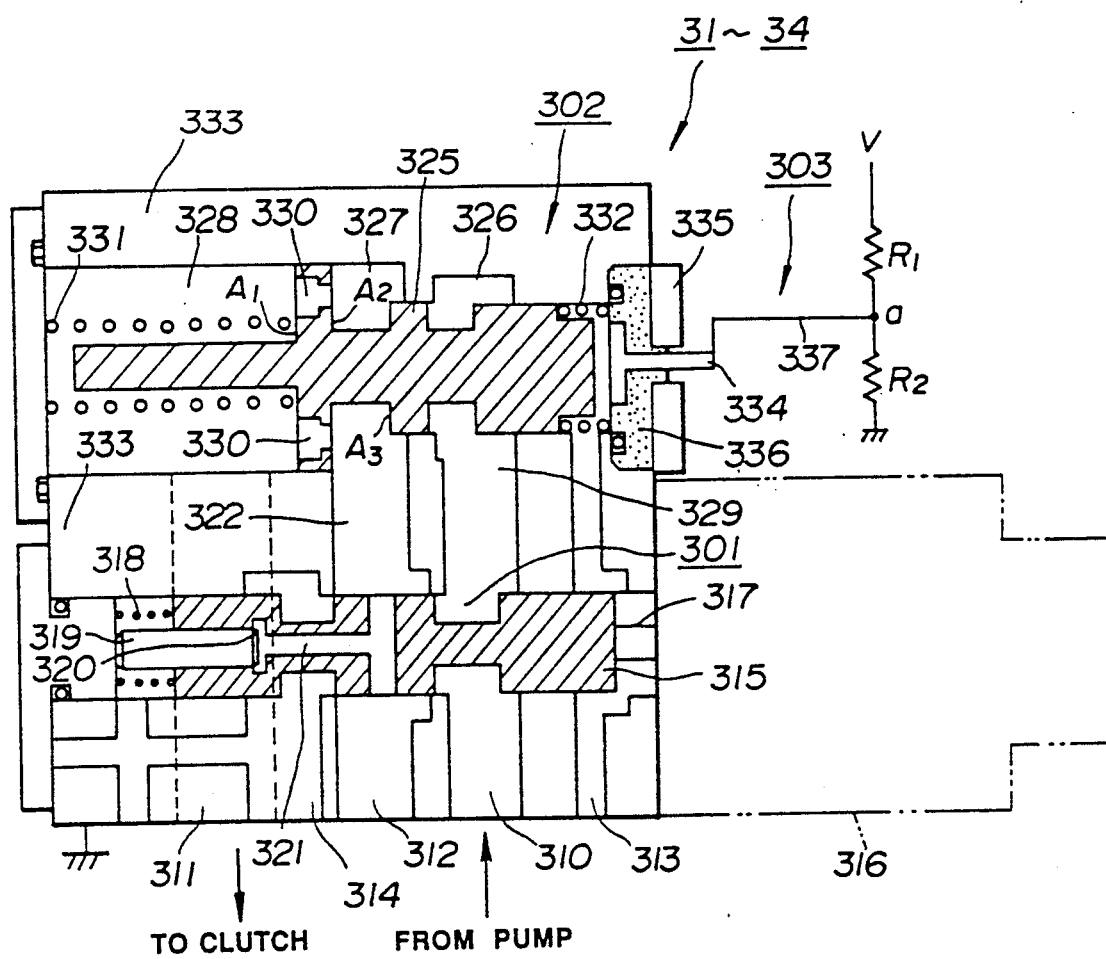
FIG. 5 is a cross-sectional view illustrating an internal configuration of a clutch oil pressure control valve.

FIG. 5 illustrates a configuration of the aforementioned clutch oil pressure control valves 31-34. As also shown in FIG. 4, the clutch oil pressure control valves 31-34 are each provided with a pressure control valve 301 for controlling the clutch oil pressure, a flow-rate detection valve 302, and a sensor element 303 for detecting the completion of filling. The pressure control valve 301 is controlled by the controller 10, while a detected signal of the sensor element 303 is input to the controller 10.

Each of the clutch oil pressure control valves 31-34 is adapted to cause the oil from the pump 21 to flow into it via an input port 310 and supply the oil to the clutch via an output port 311. A port 312 is closed, and ports 313, 314 are drain ports.

The electronically operated pressure control valve 301 has a spool 315, and a right end, as viewed in FIG. 5, of this spool 315 abuts against a plunger 317 of a proportional solenoid 316, while a spring 318 is provided on a left end thereof. The oil pressure of an oil passage 322 is fed back to an oil chamber 320 defined by the spool 315 and a piston 319 via an oil passage 321 formed in the spool 315.

The flow-rate detection valve 302 has a spool 325, which defines oil chambers 326, 327, and 328. An orifice 330 is formed between the oil chambers 327, 328 of the spool 325. The spool 325 is arranged to have three different pressure-receiving areas $A_1$, $A_2$, and $A_3$ which are provided with relationships of $A_1 + A_3 > A_2$ and $A_2 > A_3$. A spring 331 is disposed on a left end of the spool 325, and a spring 332 is disposed on a right end thereof. The spool 325 is arranged to maintain its neutral position shown in FIG. 5 with the springs 331, 332 set at the positions of their free lengths when the pressure is not built up in the oil chambers 327, 328. That is, in this case, the spring 331 acts as a return spring for the spool 325, while the spring 332 acts as a pressure-setting spring for detecting the oil pressure of the clutch.

A metallic detecting pin 334 is disposed on the right-hand side, as viewed in FIG. 5, of an upper portion of a valve body 333, and this detecting pin 334 detects that the spool 325 has moved from its neutral position shown in FIG. 5 to the right against a spring force of the spring 332. This detection pin 334 is fixed to the body 333 via an insulating sheet 336 by means of a cover 335, a lead wire 337 is led from the detection pin 334.

This lead wire 337 is connected to a point a between resistors $R_1$ and $R_2$ that are connected in series. A predetermined DC voltage V (e.g., 12 V) is applied across these resistors $R_1$, $R_2$, and the body 333 is grounded.

Referring now to the timing chart shown in FIG. 6, a description will be given of the operation of the valves 31-34 thus arranged.

Figure 6A:
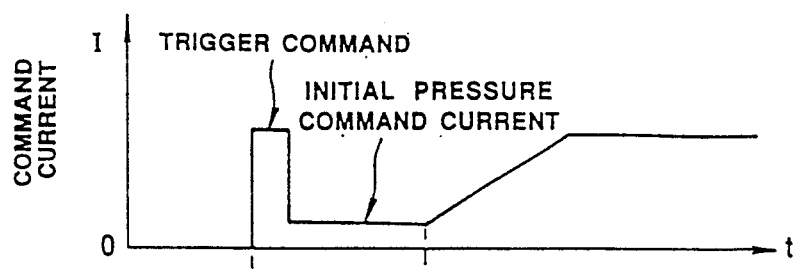
FIG. 6 is a timing chart explaining the operation of that clutch oil pressure control valve.
Figure 6B:
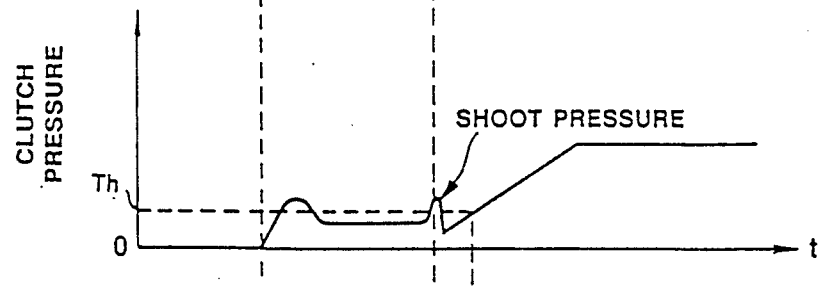
Figure 6C:
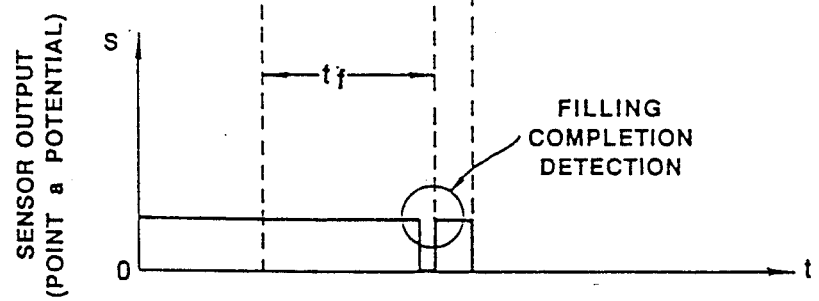
Figure 8A:
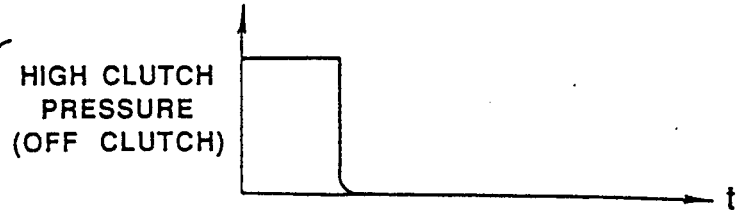
Figure 8B:
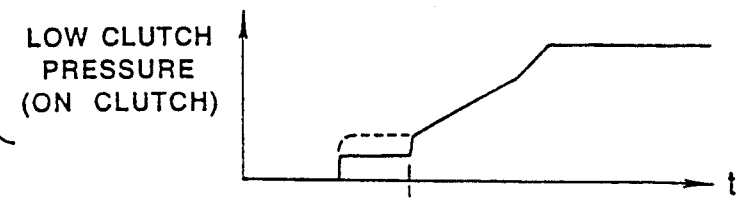
Figure 8C:
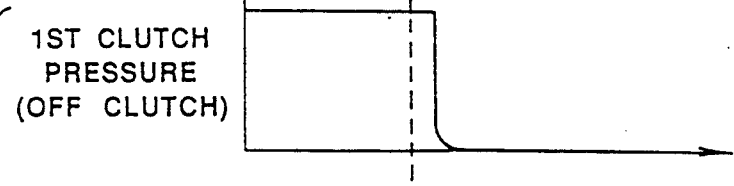
Figure 8D:
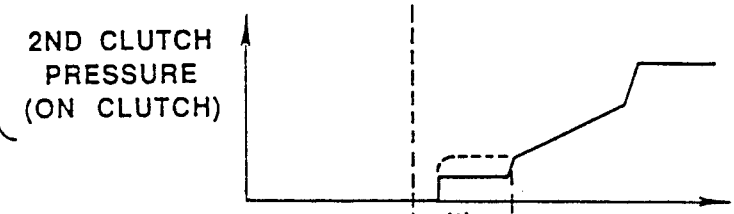
Figure 8E:
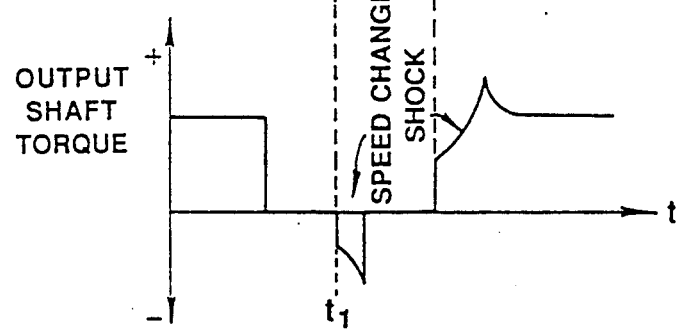

In FIG. 6, the part (a) shows a command current I from the controller 10, the part (b) the oil pressure (clutch pressure) of the oil chamber 328, and the part (c) an output of the sensor 303.

When an attempt is made to engage the clutch, the controller 10 inputs a trigger command to the solenoid 316 of a relevant clutch oil pressure control valve, and the command current I is then made to drop to a predetermined initial pressure command current corresponding to the initial pressure of the clutch oil pressure. In this state, the operation is set in a standby state until completion of the filling (see the part (a) of FIG. 6).

Upon receiving the aforementioned trigger command, the spool 315 of the pressure control valve 301 moves leftward, and the oil from the pump flows into the oil chamber 327 of the flow-rate detection valve 302 via the input port 310 and the oil passage 322. The oil which has entered the oil chamber 327 flows into the oil chamber 328 via the orifice 330 and then flows into the clutch via the output port 311. At this time, since differential pressure occurs between the oil chambers 327 and 328 by means of the orifice, the spool 325 moves leftward.

As a result, the flow-rate detection valve 302 is opened, and the oil from the pump which has entered the oil passage 329 flows into the oil chamber 327 via the oil chamber 326 and then flows into the clutch via the orifice 330, the oil chamber 328, and the output port 311. The flow of oil continues until the clutch pack is filled with the oil.

Here, when the spool 325 is in its neutral position shown in FIG. 5, and the spool 325 is in the period of a filling time $t_f$ when it is moved leftward from the neutral position, the spool 325 is spaced apart from the detecting pin 334.

For this reason, in this state, the potential at the point a is one in which the voltage V is divided by the resistors $R_1$, $R_2$, as shown in the part (c) of FIG. 6.

When the clutch pack is filled with oil, the filling is completed, and the oil no longer flows to it, so that the differential pressure on opposite sides of the orifice 330 disappears.

Accordingly, the spool 325 moves rightward by means of a force in which a force attributable to a difference in the pressure-receiving areas of the spool 325 ($A_1 + A_3 - A_2$) is added to the returning force of the spring 331.

At the time when the spool 325 returns, the oil pressure from the pump is applied to the clutch oil pressure via the oil passage 329, the oil chamber 327, the orifice 330, the oil chamber 328, and the like. As a result, an overshoot pressure such as the one shown in the part (b) of FIG. 6 is produced.

Here, the spring constant of the spring 332 has been set to a pressure Th smaller than the aforementioned overshoot pressure, as shown in the part (b) of FIG. 6.

Accordingly, during this returning operation, after moving rightward to its neutral position, as shown in FIG. 5, the spool 325 further moves by overcoming the urging force of the spring 332 by means of the shoot pressure, with the result that its right end face abuts against the pin 334.

Consequently, the detection pin 334 is made conductive with the body 333 grounded via the spool 325, so that the potential at the point a drops to zero, as shown in the part (c) of FIG. 6, and no voltage appears at the point a.

This potential at the point a has been input to the controller 10, so that the controller 10 determines the completion of filling on the basis of the fall of the potential at the point a. Immediately upon determining the completion of filling, the controller 10 gradually increases the command current I with respect to the relevant clutch from the value of the initial pressure command current (the part (a) of FIG. 6).

As a result, as shown in the part (b) of FIG. 6, after the pressure of that clutch has fallen from the value of the aforementioned overshoot pressure to the initial pressure, the clutch pressure is increased gradually. Hence, the spool 325 moves temporarily leftward toward the neutral position from the state in which it abuts against the pin 334. Subsequently, since the clutch pressure is increased gradually, the clutch pressure exceeds the set pressure Th of the spring 332 at a certain point of time. As a result, the spool 325 moves rightward again by overcoming the urging force of the spring 332, and its right end face abuts against the detection pin 334.

Hence, the potential at the point a falls again to zero and subsequently maintains this zero level.

In other words, since the potential at the point a is set to zero when a pressure exceeding the set pressure Th is built in the clutch, while that potential is set to a predetermined voltage value when the clutch pressure is less than the set pressure Th, by monitoring this potential at the point a the controller 10 is capable of not only detecting the completion of filling but also ascertaining the presence or absence of the clutch pressure, i.e., the state of engagement of the clutch.

Figure 1:
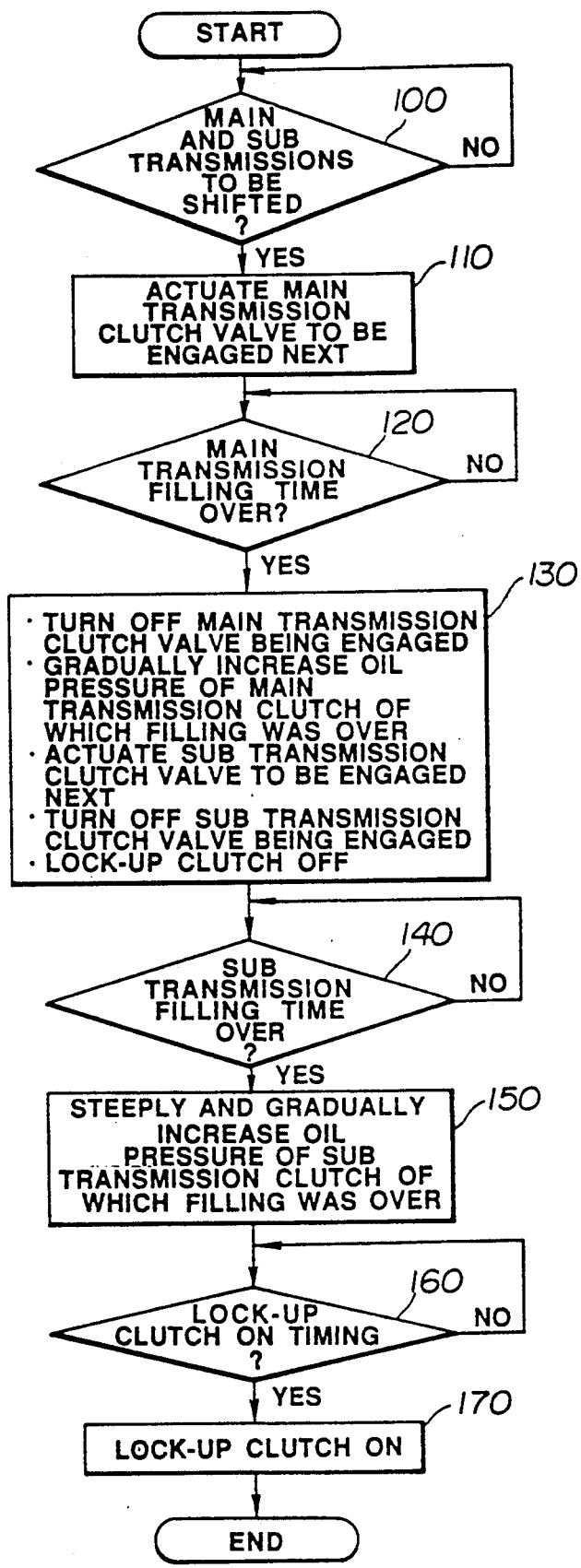
FIG. 1 is a flowchart illustrating an embodiment of a method of controlling a transmission in accordance with the present invention.

Referring now to the flowchart of FIG. 1 and the timing chart of FIG. 2, a description will be given of the speed change control by the controller 10 having the above. described configuration.

The controller 10 determines on the basis of outputs of the engine revolution sensor 7 and the throttle amount sensor 11 whether or not a speed change is to be effected. Specifically, when a speed change is to be effected, the controller 10 determines whether or not this speed change is carried out by shifting both the main transmission (1st ←→2nd) and the sub transmission (H←→L) (Step 100). If both of them are to be shifted, the following clutch control is effected.

Now, it is assumed that the 1st clutch and the High clutch are being engaged and the second speed is selected, and that a shift-up from the second speed to the third speed is to be carried out. In the third speed, the 2nd clutch and the Low clutch are engaged.

Upon starting of the speed change, the controller 10 first commences the supply of pressure oil to the clutch oil pressure control valve 34 of the main transmission-side on clutch 2nd (Step 110, timing $t_0$ in FIG. 2). At this juncture, the controller 10 sends a command value pattern such as the one shown in the part (b) of FIG. 2 to the solenoid of the clutch oil pressure control valve 34 of the clutch 2nd. In this command value pattern, an attempt is made to suppress a speed-change shock by first imparting a high level command so as to supply oil at a high flow rate, thereby accelerating the completion of filling, and by subsequently reducing the command pressure to a low level prior to the completion of filling, thereby maintaining the initial pressure for clutch engagement.

On the basis of an output of the filling detection sensor 303 of the valve 34 connected to the aforementioned main transmission clutch 2nd, the controller 10 confirms the completion of filling (Step 120), and executes the following five items (a), (b), (c), (d), and (e) of control at the timing (timing $t_1$ in FIG. 2) when the aforementioned filling completion detection signal is input from this sensor 303:

(a) The valve 33 of the main transmission clutch 1st being engaged is turned off (part (a) of FIG. 2).
(b) The oil pressure of the main transmission clutch 2nd for which the filling completion is detected is increased gradually with a low buildup rate (parts (b) and (c) of FIG. 2).
(c) The supply of the pressure oil is commenced with respect to the valve 32 of the sub transmission-side clutch L to be engaged next (parts (e) and (f) of FIG. 2).
(d) The valve 31 of the sub transmission-side clutch H being engaged is turned off (solid line in the part (d) of FIG. 2).
(e) The pressure control valve 35 of the lock-up clutch 6 is turned off (part (j) of FIG. 2).

Here, In the control of the main transmission side in items (a) and (b) above, an attempt is made to prevent a speed-change shock by setting to appropriate values the oil pressure $P_1$ (see the part (a) of FIG. 2) of the clutch 1st to be set to off and the oil pressure $P_2$ (see the part (b) of FIG. 2) of the clutch 2nd to be set to on so that the output shaft torque of the transmission 3 will become equal immediately before the speed change and upon completion of the filling.

That is, the speed-change shock occurs due to a difference in the output torque of the transmission 3 immediately before and after the speed change. For this reason, the speed-change shock can be prevented if the speed change is effected in such a manner that this torque difference disappears.

The numbers of revolutions $n_1$, $n_2$ of the input and output shafts of the torque converter 2 shown in FIG. 3 are respectively detected by the revolution sensors 7, 8. Accordingly, by determining a ratio between these numbers of revolutions, $e = n_2/n_1$, it is possible to calculate a primary coefficient (STP) and a torque ratio (ST) indicating the performance of the torque converter 2. In addition, since the input torque $T_p$ of the torque converter can be expressed as $$T_p = STP \cdot (n_1/1000)^2 \qquad (1)$$

and since the output torque $T_t$ of the torque converter can be expressed as $$T_t = T_p \cdot ST \qquad (2)$$

the value of the output torque $T_t$ of the torque converter can be calculated on the basis of these formulae and the aforementioned coefficient (STP) and torque ratio (ST).

Thus, by determining the output torque $T_t$ of the torque converter at the timing to when the aforementioned speed change command is issued, it is possible to determine the torque $T_B$ of the output shaft of the transmission 3 at that timing $t_0$ on the basis of the following formula:

$$T_B = G \cdot T_t \qquad (3)$$

where G: gear ratio of the transmission 3 as a whole

Meanwhile, the frictional torque $T_c$ of the clutch at the filling completion timing t1 of the 2nd clutch can be expressed as $$T_c K_c \cdot \mu \cdot P \qquad (4)$$

where
$K_C$: clutch coefficient at timing $t_1$
$\mu$: frictional coefficient of the clutch at timing $t_1$, and this is a function of the relative rotational speed V of the clutch disk
P: clutch oil pressure In addition, this frictional torque $T_c$ can be converted into the output shaft torque $T_A$ of the transmission 3 at the timing $t_1$ on the basis of the following Formula (5):

$$\begin{aligned} T_A &= G' \cdot T_C \\ &= K_C \cdot \mu \cdot G' \cdot P \end{aligned} \qquad (5)$$

where G': gear ratio between the engaged clutch and the output shaft of the transmission at timing t1

In order to prevent variations of the torque during speed change, it suffices if the transmission output shaft torque $T_B$ at the timing $t_0$ shown in Formula (3) and that torque $T_A$ at the timing $t_1$ shown in Formula (5) become equal. The oil pressure of the engaged clutch which satisfies this condition TB=TA can be expressed as follows on the basis of Formula (3) and (5):

$$P = (G \cdot T_i)/(K_C \cdot \mu G') \qquad (6)$$

It should be noted that since the frictional coefficient $\mu$ of the clutch shown in Formula (6) above is a function of the relative number of revolutions of the clutch disk, it is impossible to ascertain the frictional coefficient $\mu$ in advance. However, it is possible to obtain the frictional coefficient $\mu$ since the relative number of revolutions of the disk at the time of the start of speed change can be determined from the number of revolutions n2 detected by the sensor 8, the gear ratio of the transmission 3 before and after the speed change, and the number of revolutions of the output shaft detected by the sensor 9.

Accordingly, the controller 10 calculates the oil pressure $P_2$ to be applied to the speed-change clutch 2nd on the basis of the aforementioned Formula (6), and causes this oil pressure value $P_2$ to act on the 2nd clutch.

It should be noted that it suffices if the oil pressure $P_1$ to be applied to the 1st clutch is a value which is capable of maintaining the output torque value during the filling time $t_0$–$t_1$, and this oil pressure value $P_1$ can also be determined in accordance with the aforementioned Formulae (3) and (5).

Next, in the control of the sub transmission side in items (c) and (d) above, the initial pressure $P_3$ with respect to the clutch L to be set to on is set to a relatively high level, thereby accelerating the completion of filling. In addition, also with respect to the clutch H to be set to off, in this case, the clutch H is set to off immediately at the timing $t_1$ when the filling of the main transmission clutch 2nd is completed. That is, at this timing $t_1$, since inertia energy is accumulated in the intermediate shaft of the transmission 3, even if the clutch H is set to off at the timing $t_1$, the torque off does not usually take place. Incidentally, with a transmission in which the inertia energy to the intermediate shaft is small, it is desirable to maintain the oil pressure at a certain level until the filling of the clutch L is completed, as indicated by the broken line in the part (d) of FIG. 2.

Next, the controller 10 determines the completion of filling on the basis of the output of the filling detection sensor 303 of the valve 32 connected to the sub transmission clutch L for which the supply of the pressure oil has been commenced (Step 140). At the point of time (timing $t_2$ in FIG. 2) when the filling completion detection signal is input thereto from the sensor 303, the controller 10 starts to build up the oil pressure with respect to this sub transmission clutch L (Step 150). However, the buildup rate with respect to this sub transmission clutch L is set to be sharper than the main transmission-clutch, so that the sub transmission-side clutch will complete engagement earlier than the main transmission-side clutch. It is possible to go too far in saying that the oil pressure of the sub transmission may be raised instantly to its upper limit upon completion of the filling of the sub transmission.

After such control of the main and sub transmissions is completed, the controller 10 determines the timing of completion of the speed change (Step 160), and determines a timing $t_3$ for starting the buildup of the oil pressure of the lockup clutch 6 on the basis of that determination. As the method of determining the timing for starting this buildup, the following three methods are available:

(I) Setting of Interval Time

An optimum interval time TI ($=t_3-t_1$) is determined in advance by using various speeds and engine power (throttle opening) as parameters through simulation, an actual vehicle test, and the like, and this optimum interval time is stored in a memory of the controller 10 in accordance with a map system. In addition, the interval time TI corresponding to the output of the throttle amount sensor 11 and the present speed is read from this memory at the time of speed change, and the buildup of the oil pressure is commenced at the point of time when this interval time TI has elapsed.

(II) Method of Responding to the Relative Number of Revolutions of the Clutch

The relative number of revolutions of the clutch ($=n_3G-n_2$, G: gear ratio) is determined from outputs $n_2$ and $n_3$ of the input shaft revolution sensor 8 and output shaft revolution sensor 9 of the transmission, and the buildup is commenced when this calculated value has become zero or a value close to zero.

(III) Method of Responding to the Torque Converter Value e

The torque converter value e ($=n_2/n_1$) is calculated from outputs of the engine revolution sensor 7 and the transmission input shaft sensor 8 (or output shaft sensor 9), and the buildup is commenced when this value e has exceeded a certain set value.

When the controller 10 determines the buildup starting timing $t_3$ for the lock-up clutch 6 in accordance with any of the above-described methods, the controller 10 measures the throttle opening S, the vehicle weight I, and the gear ratio, calculates an optimum buildup rate on the basis of these measured values, and increases the lock-up clutch oil pressure by means of that calculated value (Step 310). This operation of gradually increasing the oil pressure is stopped when the torque converter value e has become "1" or a set value close to "1".

Thus, in accordance with this embodiment, in a two-stage clutch configuration in which L1, H1, L2, H2 are respectively used for the 1st speed, 2nd speed, 3rd speed, and 4th speed, if there is the possibility of the occurrence of two speed-change shocks including the reverse speed-change shock, as referred to in connection with the related art, in the shifting of both main and sub clutches from H1 to L2, for instance, the shifting of the main transmission (1st→2nd) is first effected, the filling of the on clutch of the sub transmission is commenced upon completion of the filling of the main transmission-side on clutch, and the pressure of the sub transmission-side clutch is raised at a sharp buildup rate after the completion of that filling, thereby completing the engagement of the sub transmission-side clutch before the completion of engagement of the main transmission-side clutch. In other words, the setting provided is such that the relative number of revolutions of the sub transmission clutch (Low) becomes zero before the relative number of revolutions of the main transmission clutch (2nd) becomes zero, as shown in the part (g) of FIG. 2. In consequence, by virtue of this control, at the time of a shift-up from the 2nd speed (H1) to the 3rd speed (L2), the speed change is effected in the manner of the 2nd speed →4th speed→3rd speed, thus momentarily going through the 4th speed (H2). However, this speed which the shift goes through is a speed on the shift-up side, and the time which it goes through is extremely short as compared with the prior art. In addition, at the timing $t_1$, since the torque adjustment of the main transmission through the clutch pressures $P_1$, $P_2$ is undertaken, no speed change shock toward the opposite side occurs, and apparently the torque variation experiences only one speed-change shock in the same way as a shift in a one-stage clutch configuration. It should be noted that the output shaft torque before the engagement of the main transmission is produced owing to the inertia energy of the intermediate shaft of the transmission 3.

In addition, in this embodiment, the lock-up clutch 6 is set to off at the timing $t_1$ when the filling time of the main transmission is completed, as shown in the part (j) of FIG. 2. For this reason, it is possible to obviate the drawback that the output torque of the transmission 3 becomes zero owing to the torque converter 2 during the filling time, as experienced with the conventional method in which the lock-up clutch is set to off at the timing $t_0$ when a speed-change command is output. If the lock-up clutch 6 is cut off at the timing $t_1$, the speed ratio between the pump and the turbine inside the torque converter 2 actually becomes "1" temporarily, and it is therefore considered that there is a moment when the torque is not converted. However, at this moment $t_1$, since the former stage clutch (1st) is set to off and the latter stage clutch (2nd) begins to engage, the inertia energy inside the transmission is used for engagement of the latter stage clutch (2nd) and hence appears as the output torque, so that, in actuality, there is no time when the torque does not act. In addition, since the speed of the turbine inside the torque converter 2 drops sharply due to load as the latter-stage clutch (2nd) begins to engage, the torque conversion is effected inside the torque converter 2 immediately after the timing $t_1$.

Furthermore, in this embodiment, the oil pressure of the clutch being engaged is lowered to an appropriate level until the filling time is completed, and the oil pressure of that clutch is lowered from that level to zero upon completion of the filling time. Hence, it is possible to prevent torque variations at the start of engagement of the ensuing clutch to higher accuracy.

It should be noted that although an example of a shift-up has been shown in the above.described embodiment, similar control may be effected at the time of a shift-down from the 3rd speed (L2) to the 2nd speed (H1), for example.

In addition, although in the above.described embodiment the completion of filling is detected by using the filling completion detecting sensor 303 having the configuration shown in FIG. 5, it is possible to employ a filling completion detecting sensor having a different configuration. Furthermore, it is possible to adopt a method based on time control in which an appropriate filling time is set in advance.

Moreover, although in this embodiment the output torque of the transmission 3 prior to speed change is calculated on the basis of the output torque ($T_t$) at the time when the oil pressure $P_2$ is calculated, it is possible to adopt a method in which the output torque of the transmission 3 is determined from the output torque of the engine by using an output characteristic of the engine 1 which is known in advance, or a method in which the output torque of the transmission 3 is directly determined by using a torque sensor.

In addition, the present invention is applicable to both the manual transmission vehicle and the automatic transmission vehicle.

Moreover, although in the above.described embodiment the present invention is applied to a transmission having two sub transmissions H, L in the first stage and two main transmissions 1st, 2nd in the second stage, it goes without saying that the present invention is applicable to other types of transmissions, such as (main: H, L, sub: 1, 2, 3, 4, R) or (main: F, R, sub: 1, 2, 3, 4).

What is claimed is:

1. A method for controlling a transmission system which includes a transmission having a plurality of sub transmission clutches in a first stage from an input shaft of said transmission and a plurality of main transmission clutches in a second stage and is adapted to select a speed through a combination of said sub transmission clutches and said main transmission clutches, and a plurality of pressure control valves respectively connected to said plurality of clutches of said transmission and adapted to produce in a relevant one of said clutches oil pressure corresponding to an electric command input thereto, wherein said pressure control valves are controlled at the time of speed change when said clutches to be engaged are both said sub transmission clutch and said main transmission clutch, comprising the sequential steps of:

actuating said pressure control valve corresponding to said main transmission clutch to be engaged, thereby supplying pressure oil to said main transmission clutch;

confirming the completion of a filling time of said main transmission clutch;

upon confirming the completion of said filling time, turning off said pressure control valve corresponding to said main transmission clutch being presently engaged, actuating said pressure control valve corresponding to said sub transmission clutch to be engaged so as to supply the pressure oil to said sub transmission clutch, and controlling said pressure control valve corresponding to said main transmission clutch in such a manner as to gradually increase the pressure of said main transmission clutch for which the completion of said filling time has been confirmed;

confirming the completion of said filling time with respect to said sub transmission clutch; and upon confirming the completion of said filling time of said sub transmission clutch, turning off said pressure control valve corresponding to said sub transmission clutch being presently engaged, and controlling the pressure of said sub transmission clutch for which the completion of said filling time has been confirmed by gradually increasing said clutch pressure in such a manner that said sub transmission clutch is engaged earlier than said main transmission clutch.

2. A method for controlling a transmission system which includes a transmission having a plurality of sub transmission clutches in a first stage from an input shaft of said transmission and a plurality of main transmission clutches in a second stage and is adapted to select a speed through a combination of said sub transmission clutches and said main transmission clutches, and a plurality of pressure control valves respectively connected to said plurality of clutches of said transmission and adapted to produce in a relevant one of said clutches oil pressure corresponding to an electric command input thereto, wherein said pressure control valves are controlled at the time of speed change when said clutches to be engaged are both said sub transmission clutch and said main transmission clutch, comprising the sequential steps of:

actuating said pressure control valve corresponding to said main transmission clutch to be engaged, thereby supplying pressure oil to said main transmission clutch;

confirming the completion of a filling time of said main transmission clutch;

upon confirming the completion of said filling time, turning off said pressure control valves corresponding to said main transmission clutch and said sub transmission clutch being presently engaged, actuating said pressure control valve corresponding to said sub transmission clutch to be engaged so as to supply the pressure oil to said sub transmission clutch, and controlling said pressure control valve corresponding to said main transmission clutch in such a manner as to gradually increase the pressure of said main transmission clutch for which the completion of said filling time has been confirmed;

confirming the completion of said filling time with respect to said sub transmission clutch; and upon confirming the completion of said filling time of said sub transmission clutch, controlling the pressure of said sub transmission clutch by gradually increasing said clutch pressure in such a manner that said sub transmission clutch is engaged earlier than said main transmission clutch.

3. A method for controlling a transmission system which includes a transmission having a plurality of sub transmission clutches in a first stage from an input shaft of said transmission and a plurality of main transmission clutches in a second stage and is adapted to select a speed through a combination of said sub transmission clutches and said main transmission clutches, a plurality of pressure control valves respectively connected to said plurality of clutches of said transmission and adapted to produce in a relevant one of said clutches oil pressure corresponding to an electric command input thereto, a lock-up clutch for directly coupling input and output shafts of a torque pressure corresponding to the electrical command input to be produced in said lock-up clutch, wherein said pressure control valves are controlled at the time of speed change when said clutches to be engaged are both said sub transmission clutch and said main transmission clutch, comprising the sequential steps of:

actuating said pressure control valve corresponding to said main transmission clutch to be engaged, thereby supplying pressure oil to said main transmission clutch;

confirming the completion of a filling time of said main transmission clutch;

upon confirming the completion of said filling time, turning off said pressure control valve corresponding to said main transmission clutch being presently engaged and said pressure control valve of said lock-up clutch, actuating said pressure control valve corresponding to said sub transmission clutch to be engaged so as to supply the pressure oil to said sub transmission clutch, and controlling said pressure control valve corresponding to said main transmission clutch in such a manner as to gradually increase the pressure of said main transmission clutch for which the completion of said filling time has been confirmed;

confirming the completion of said filling time with respect to said sub transmission clutch;

upon confirming the completion of said filling time of said sub transmission clutch, turning off said pressure control valve corresponding to said sub transmission clutch being presently engaged, and controlling the pressure of said sub transmission clutch for which the completion of said filling time has been confirmed by gradually increasing said clutch pressure in such a manner that said sub transmission clutch is engaged earlier than said main transmission clutch;

detecting the completion of the speed change; and upon detection thereof, controlling said pressure control valve of said lock-up clutch in such a manner as to gradually increase the oil pressure of said lock-up clutch.

4. A method for controlling a transmission system which includes a transmission having a plurality of sub transmission clutches in a first stage from an input shaft of said transmission and a plurality of main transmission clutches in a second stage and is adapted to select a speed through a combination of said sub transmission clutches and said main transmission clutches, a plurality of pressure control valves respectively connected to said plurality of clutches of said transmission and adapted to produce in a relevant one of said clutches oil pressure corresponding to an electric command input thereto, a lock-up clutch for directly coupling input and output shafts of a torque converter, and a pressure control valve for causing oil pressure corresponding to the electrical command input to be produced in said lock-up clutch, wherein said pressure control valves are controlled at the time of speed change when said clutches to be engaged are both said sub transmission clutch and said main transmission clutch, comprising the sequential steps of:

actuating said pressure control valve corresponding to said main transmission clutch to be engaged, thereby supplying oil pressure to said main transmission clutch;

confirming the completion of a filling time of said main transmission clutch;

upon confirming the completion of said filling time, turning off said pressure control valves corresponding to said main transmission clutch and said sub transmission clutch both being presently engaged and said pressure control valve of said lock-up clutch, actuating said pressure control valve corresponding to said sub transmission clutch to be engaged so as to supply the pressure oil to said sub transmission clutch, and controlling said pressure control valve corresponding to said main transmission clutch in such a manner as to gradually increase the pressure of said main transmission clutch for which the completion of said filling time has been confirmed;

confirming the completion of said filling time with respect to said sub transmission clutch;

upon confirming the completion of said filling time of said sub transmission clutch, controlling the pressure of said sub transmission clutch by gradually increasing said clutch pressure in such a manner that said sub transmission clutch is engaged earlier than said main transmission clutch;

detecting the completion of the speed change; and upon detection thereof, controlling said pressure control valve of said lock-up clutch in such a manner as to gradually increase the oil pressure of said lock-up clutch.

* * * * *